United States Patent
Zhadanov et al.

(10) Patent No.: US 7,373,954 B2
(45) Date of Patent: May 20, 2008

(54) MULTI-WAYS WATER DISTRIBUTING DEVICE

(76) Inventors: Sam Zhadanov, 2944 W. 5th St., Apt. 20J, Brooklyn, NY (US) 11224; Eli Zhadanov, 2944 W. 5th St., Apt. 20J, Brooklyn, NY (US) 11224

( * ) Notice: Subject to any disclaimer, the term of this patent is extended or adjusted under 35 U.S.C. 154(b) by 75 days.

(21) Appl. No.: 11/408,887

(22) Filed: Apr. 24, 2006

(65) Prior Publication Data

US 2007/0246110 A1    Oct. 25, 2007

(51) Int. Cl.
*F16K 11/08* (2006.01)
(52) U.S. Cl. .................... 137/625.47; 4/601
(58) Field of Classification Search .......... 137/625.47; 251/288, 297, 143; 4/601, 615; 248/75; 239/437
See application file for complete search history.

(56) References Cited

U.S. PATENT DOCUMENTS

| | | | | |
|---|---|---|---|---|
| 2,698,731 A | * | 1/1955 | Koehler et al. | ............. 251/172 |
| 3,112,073 A | * | 11/1963 | Larson et al. | ................ 239/446 |
| 3,976,102 A | * | 8/1976 | Crocker | .................. 137/625.47 |
| 4,177,835 A | * | 12/1979 | Paley | .......................... 137/883 |
| 4,314,586 A | * | 2/1982 | Folkman | ................ 137/625.47 |
| 4,566,480 A | * | 1/1986 | Parham | ...................... 137/271 |
| 5,771,930 A | * | 6/1998 | Visk | ...................... 137/625.47 |
| 5,944,055 A | * | 8/1999 | Dicky | ................... 137/625.47 |
| 7,299,510 B2 | * | 11/2007 | Tsai | .............................. 4/615 |

* cited by examiner

Primary Examiner—John Fox
(74) Attorney, Agent, or Firm—I. Zborovsky

(57) ABSTRACT

A water distributing device has one input pipe and two output pipes; a casing, and a turning rod located in the casing and turnable in the casing so as to provide a discharge of water in a first direction, a discharge of water in a second direction, a discharge of water in both directions with redistribution of a quantity of water, and a stopping of a flow of water.

11 Claims, 7 Drawing Sheets

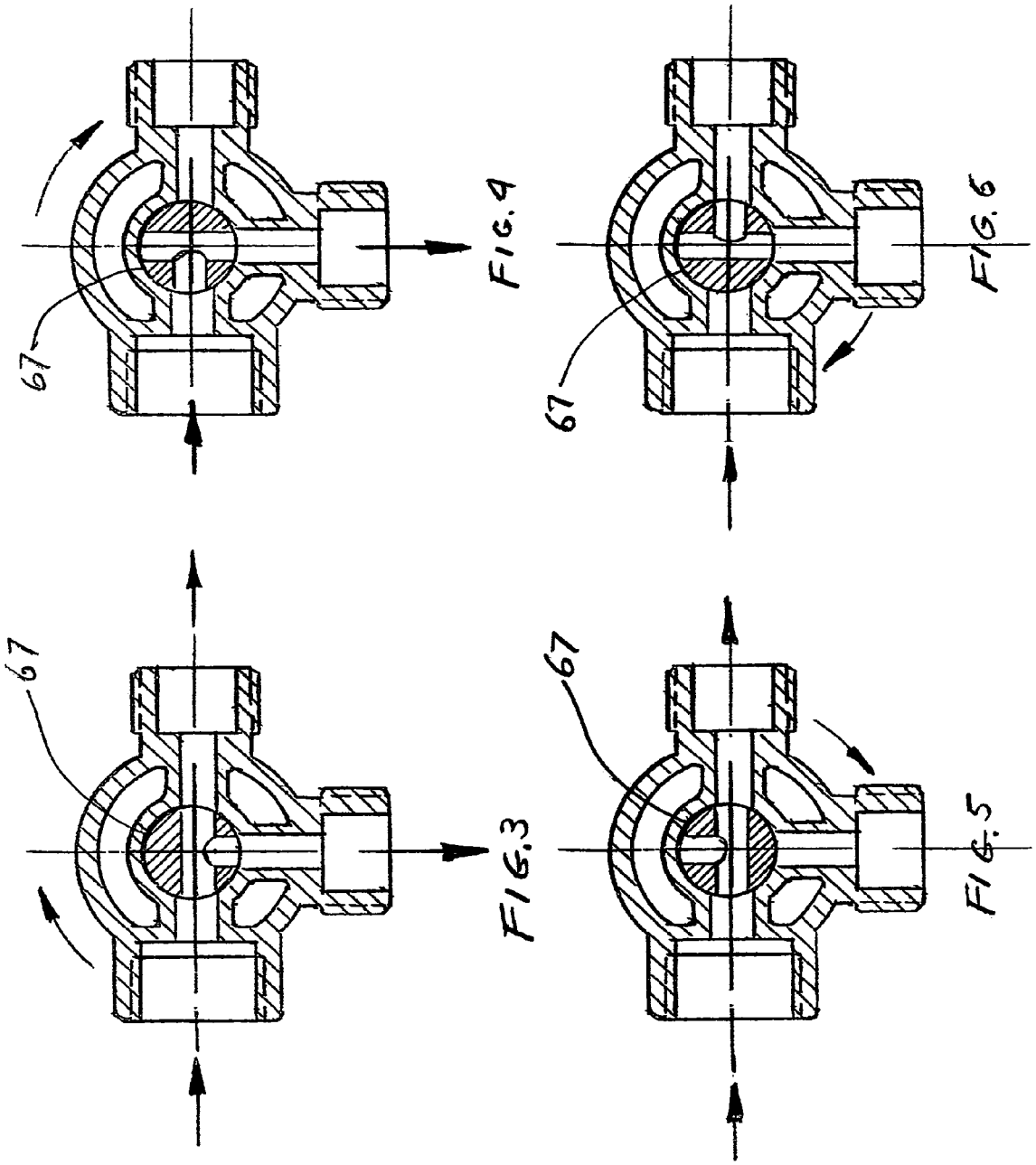

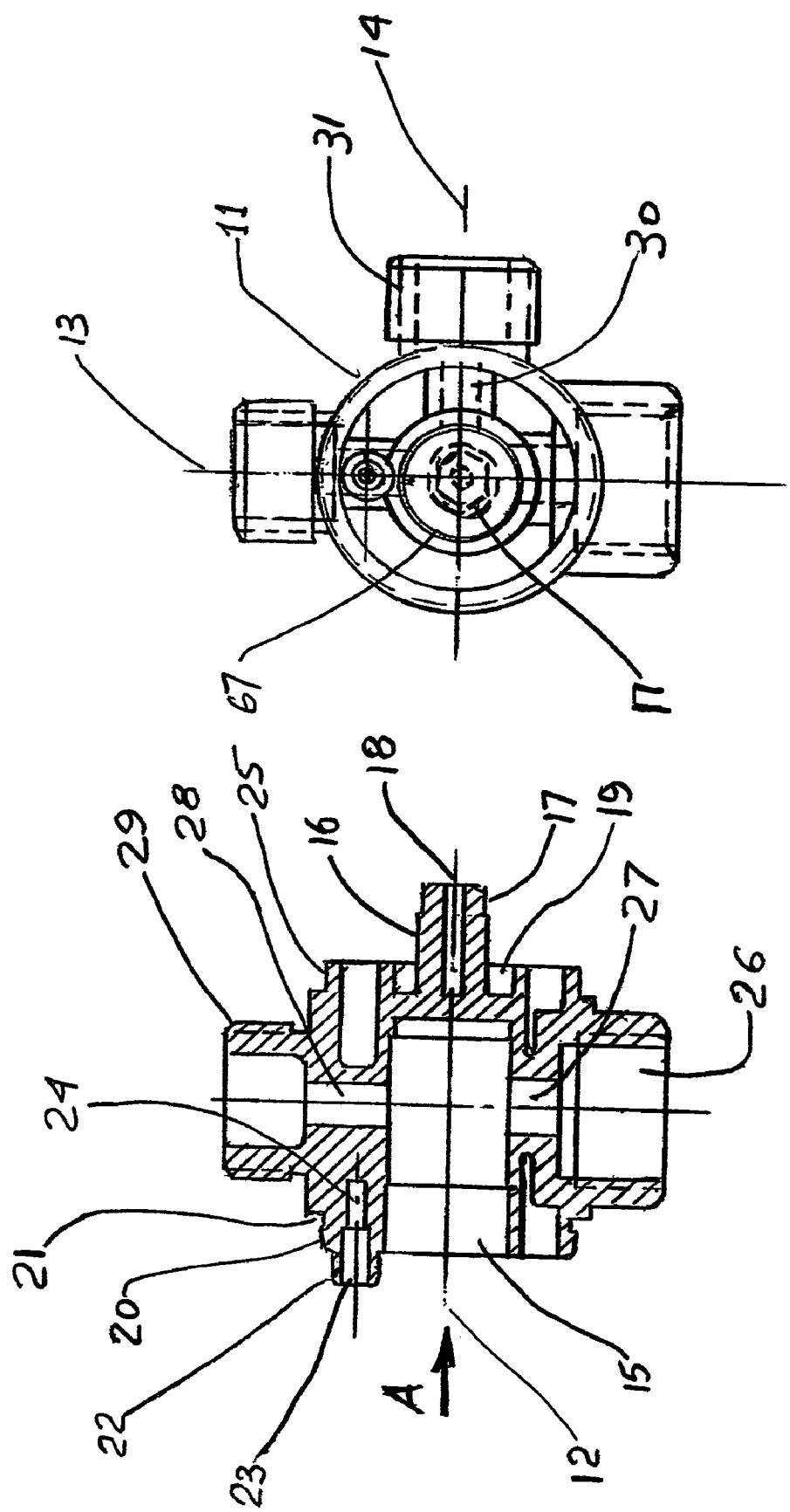

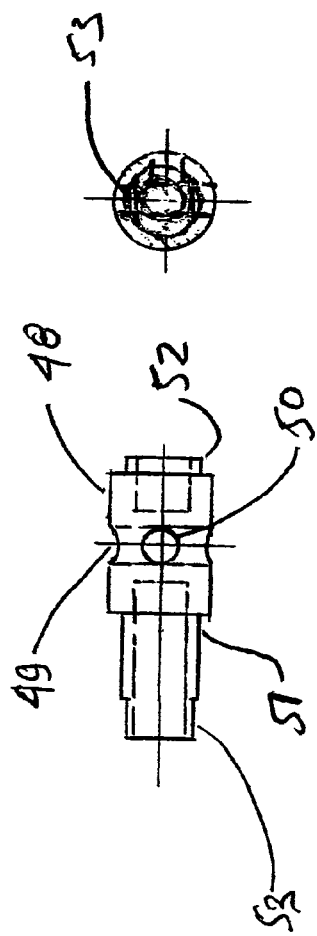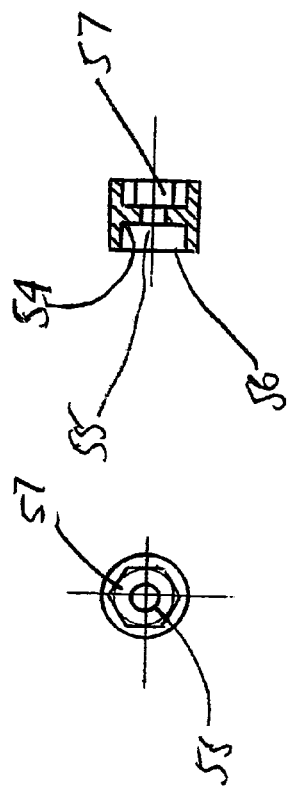

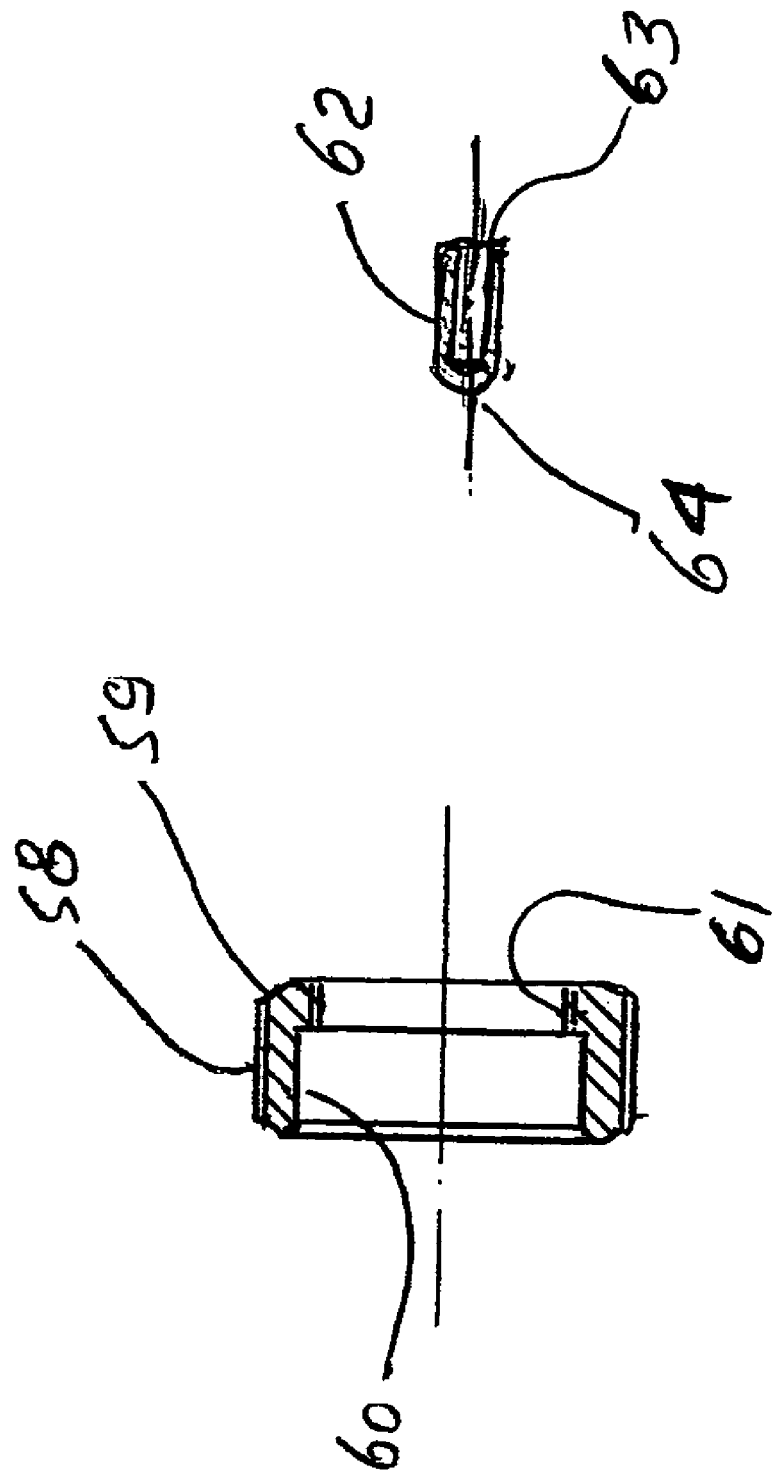

MULTI-WAYS WATER DISTRIBUTING DEVICE

BACKGROUND OF THE INVENTION

The present invention relates to a water distributing device for shower systems and operates for distribution of water from a showerhead to a hand-held shower element.

Devices of the above mentioned general type are known in the art. The existing devices provide distribution of water in only two directions. In addition, in this case in the system, a bracket for the hand-held shower element is provided separately.

In new shower systems there is a need to provide additional positions for distribution of water in two directions simultaneously, with the possibility of adjustment of water dosage according to the directions, as well as a complete shutoff of the device. However, these functions are not provided in the existing devices.

SUMMARY OF THE INVENTION

Accordingly, it is an object of the present invention to provide a device for water distribution, which is a further improvement of the existing devices.

In keeping with these objects and with others which will become apparent hereinafter, one feature of the present invention resides, briefly stated, in a water distributing device for shower systems, comprising one input pipe and two output pipes; a casing, and a turning rod located in said casing and turnable in said casing so as to provide a discharge of water in a first direction, a discharge of water in a second direction, a discharge of water in both directions with redistribution of a quantity of water, and a stopping of a flow of water.

When the device is designed in accordance with the present invention, it has a construction with a four-position distributor with a built-in turnable holder or bracket, providing four ways water supply.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a transverse section of the inventive device in a position 1;

FIG. 4 is a view showing a transverse section of the inventive device in a position 2;

FIG. 5 is a view showing a transverse section of the inventive device in a position 3;

FIG. 6 is a transverse cross-section of the inventive device in a position 4;

FIG. 7 is a view showing a side cross-section of a casing of the inventive device;

FIG. 8 is a view showing an end view of the casing of the inventive device A;

FIG. 13 is a side view of a shaft of the inventive device;

FIG. 14 is a transverse section of the shaft of the inventive device;

FIG. 15 is an end view of a bushing of the inventive device;

FIG. 16 is a side sectional view of the bushing of the inventive device;

FIG. 17 is a view showing a section of a lock nut of the inventive device; and

FIG. 18 is a view showing a section of a fixator of the inventive device.

DESCRIPTION OF THE PREFERRED EMBODIMENTS

Figures 1, 2:
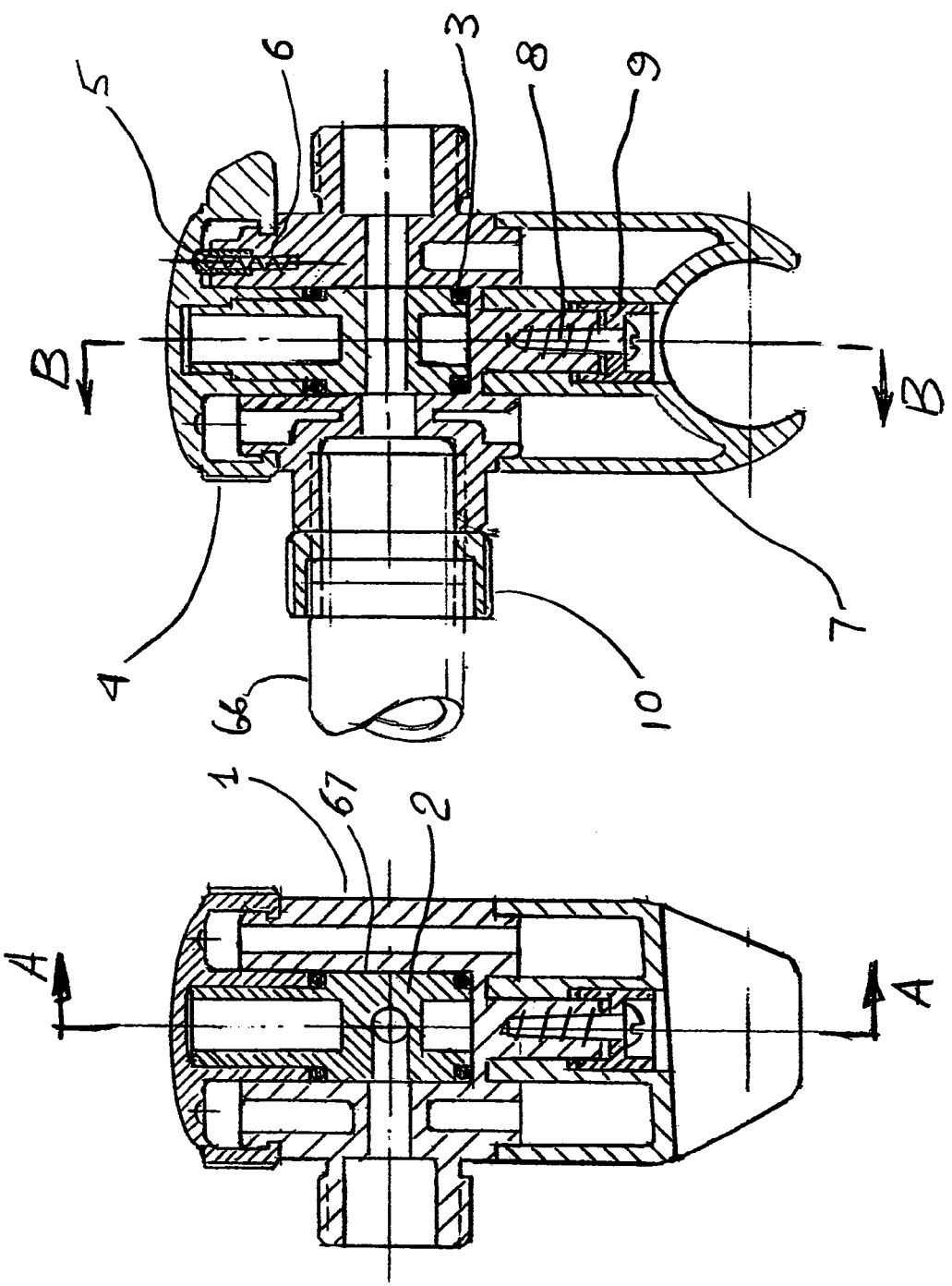
FIG. 1 is a view showing a longitudinal section of the inventive device taken along the line B-B.
FIG. 2 is a view showing a longitudinal section of the inventive device taken along the line A-A.

A device for distribution of water for shower systems has a casing which is identified with reference numeral 1 in FIGS. 1 and 2. A turnable rod 2 is located inside the casing 1 and has sealing rings 3. It is connected with a handle 4. A fixator 5 with an inner spring 6 is located in the casing.

An extension or bracket 7 is hingedly connected with the casing and pressed by a screw 8 and a bushing 9 to a side surface of the casing. The device has a lock nut 10.

The casing 1 which is shown in detail in FIGS. 7 and 8 is formed as a cylindrical reservoir 11 having three axes 12, 13, 14, located at an angle of 90° relative to one another. An opening 15 and a cylindrical pipe 16 with a hexagon 17 and an opening 18 extends along the axis 12. The pipe is located inside a cylindrical groove 19. A flange 20 with an annular groove 21, a cylindrical lug 22 with openings 23 and 24 are located in the front part of the casing. A flange 25 is provided on the rear part of the casing.

An inlet threaded opening 26 with an opening 27 and also an outlet opening 28 with a threaded pipe 29 extends along the axis 13 of the casing.

A second outlet opening 30 with a threaded pipe 31 extends along the axis 14 of the casing.

Figure 10:
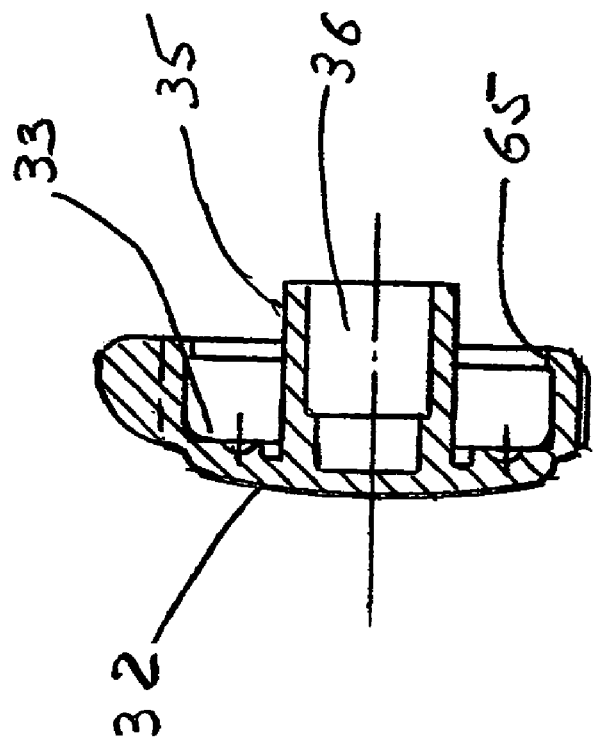
FIG. 10 is a side sectional view of the knob of the inventive device.
Figure 9:
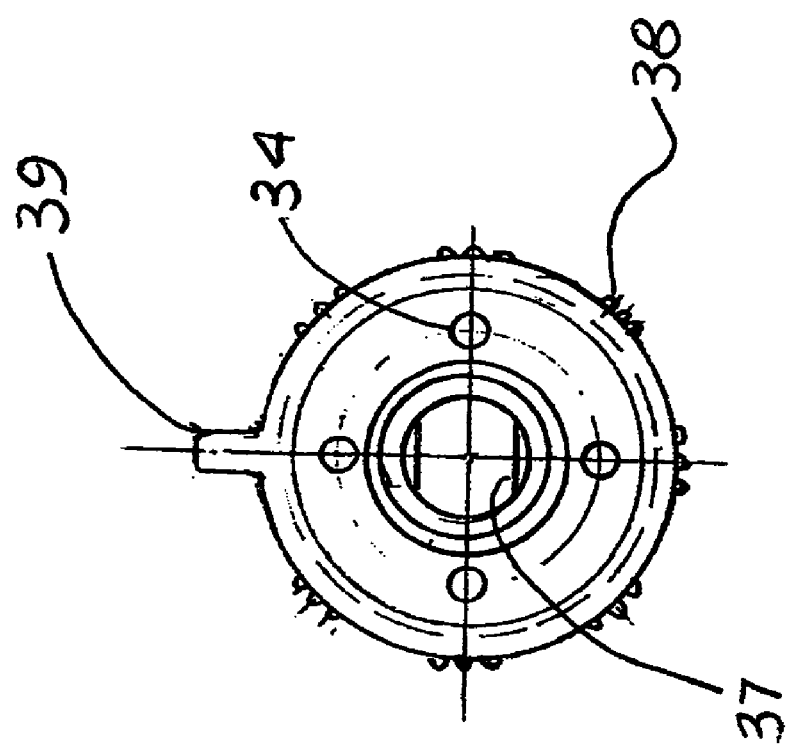
FIG. 9 is an end view of a knob of the inventive device.

The handle 4 shown in FIGS. 9 and 10 is configured as a hollow cover 32 with a flat bottom 33 provided with four part-spherical depressions 34. The handle has a hub 35 with an inner opening 36 which has in a smaller opening limited by the planes 37. The outer surface has rib-shaped grips 38 and a pointing projection 39. At the end the handle has an annular 65.

Figure 12:
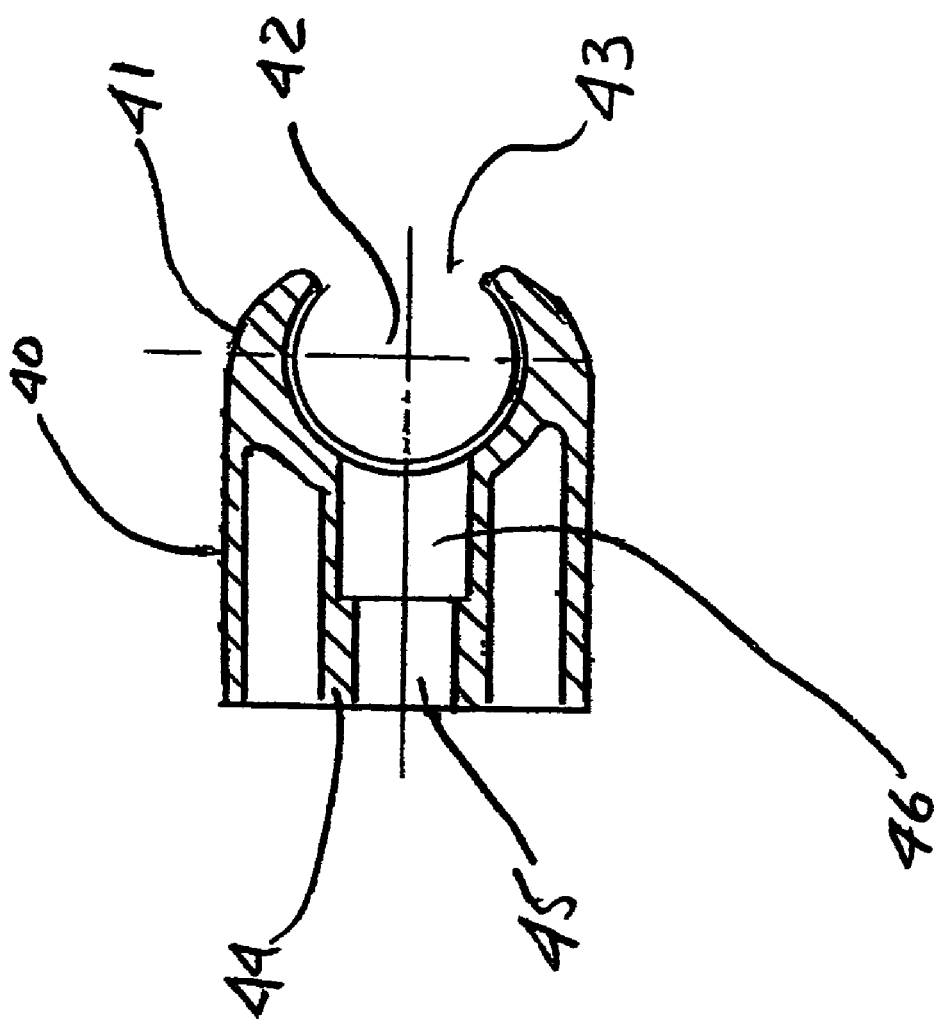
FIG. 12 is a sectional side view of the bracket of the inventive device.
Figure 11:
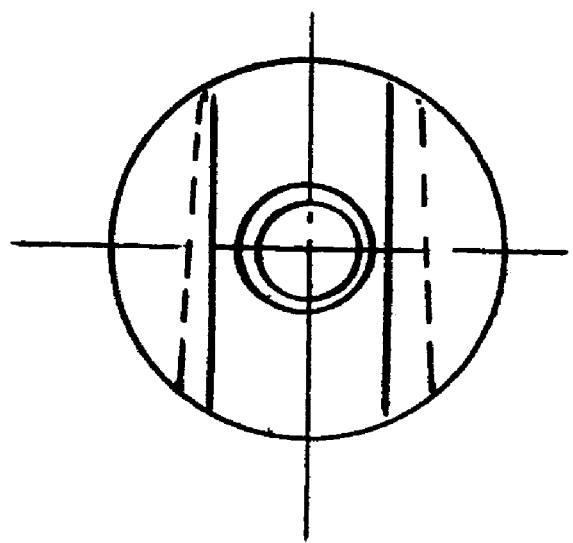
FIG. 11 is an end view of the bracket of the inventive device.

The bracket 7 shown in FIGS. 11 and 12 has a cylindrical body 40 with a part-spherical surface 41, having a built-in conical opening 42 which is open from one side 43. The body is hollow and has a hub 44 with openings 45 and 46 in it.

The rod 2 shown in FIGS. 13 and 14 is formed as a stepped element. It has a cylindrical surface 48 with two openings in its sender, namely a throughgoing opening 49 and a blind opening 50. It has two portions 51 and 52, for a sealing ring and reduced parts limited by planes 53.

The bushing 9 shown in FIGS. 15 and 16 has a central partition 54 with an opening 55. A cylindrical opening 56 is located at one side of the partition, while a hexagonal opening 57 is located at the other side of the partition.

The lock nut 10 shown in FIG. 17 is cylindrical and has a knurling 58 on an outer surface 59 with a cylindrical portion 60 and a threaded portion 61.

The fixator 5 shown in FIG. 8 is formed as a pin 62 with an inner opening 63 and a part-spherical surface 64 on its end.

The device is assembled in the following manner.

The rod 2 with the rubber seals 3 is introduced into the opening 15 of the casing 1 (FIG. 7). Then, on the part 51 of the rod (FIG. 13), the handle 4 (FIG. 9, FIG. 10) is placed with the hub 35, the opening 36, and fixed by the surfaces 37 and 53. The handle is held on the casing by the annular grip 65 (FIG. 10) in the grooves 21 of the casing 1 (FIG. 7) by pressing-on. The bracket 7 is placed (FIG. 11, FIG. 12) on the axis of the body 16 (FIG. 7) and fixed by the bushing 9 with the screw 8. The hexagonal opening 57 (FIG. 16) and the hexagonal portion 17 on the axis 16 (FIG. 7, FIG. 8) prevent unscrewing during turning of the bracket. The device is placed on the pipe with a taper thread 66 (FIG. 2) and fixed in the working position by the lock nut 10.

The operation of the device is carried out by turning of the handle 4 (FIG. 2) over 360° with fixation of four positions shown in the drawings, namely:

FIG. 3 supply of water in two directions simultaneously,
FIG. 4 supply of water into the side outlet,
FIG. 5 supply of water into a direct outlet,
FIG. 6 stopping of the flow It will be understood that each of the elements described above, or two or more together, may also find a useful application in other types of constructions differing from the types described above.

While the invention has been illustrated and described as embodied in a four ways water distributing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multi-way water distributing device, comprising a casing having one input pipe and two output pipes; means rotatable in said casing for providing a discharge of water in a first direction, or a discharge of water in a second direction and having a rotating handle; a rotatable holder for holding a working instrument, said handle and said holder being arranged on one axis at opposite sides of said casing as considered in an axial direction of said axis and being rotatable about said one axis; a non-rotatable screw which is screwed directly in said casing so as not to rotate relative to the latter, said holder being rotatable relative to said screw.

2. A multi-way water distributing device as defined in claim 1, wherein said means include a rod which has two mutually perpendicular openings, including a throughgoing opening and a blind opening.

3. A multi-way water distributing device as defined in claim 2, wherein said inlet opening is formed so that for turning off of the flow of water said inlet opening is shut off by a rear wall of said blind opening of said rod.

4. A multi-way water distributing device as defined in claim 1, wherein said rod has openings, said casing having a solid rear wall blocking said openings of said rod successively.

5. A multi-way water distributing device as defined in claim 1, wherein said holder for holding a working instrument has a receptacle for the working instrument and is rotatable to adjust an angular position of the working instrument.

6. A multi-way water distributing device as defined in claim 1, wherein said handle has part-spherical depressions for a fixing element and having an annular grip for locking in a working zone.

7. A multi-way water distributing device as defined in claim 1 wherein said providing means is configured also to provide a discharge of water both in said first and second directions with redistribution of a quantity of water.

8. A multi-way water distributing device as defined in claim 1, wherein said providing means is configured so as to provide stopping of a flow of water.

9. A multi-way water distributing device as defined in claim 1, wherein said providing means is configured to provide also a discharge of water both in said first and second directions simultaneously with redistribution of a quantity of water, and also to provide stopping of a flow of water.

10. A multi-way water distributing device as defined in claim 1, wherein said input pipe and said output pipes are located on two axes which are perpendicular to said one axis relative to which said handle and said holder are rotatable.

11. A multi-way water distributing device as defined in claim 1, wherein said inlet and outlet pipes are separated from said holder so that water does not flow to said holder.

\* \* \* \* \*